July 31, 1962 C. PERNETTA 3,047,280
SPRING MOTOR
Filed Feb. 18, 1960 4 Sheets-Sheet 1
FIG. 1. FIG. 2. FIG. 3.
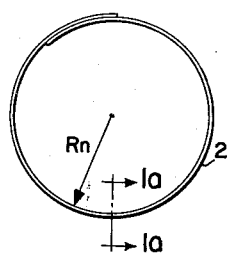
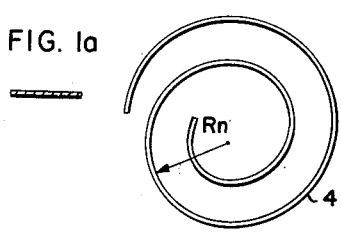
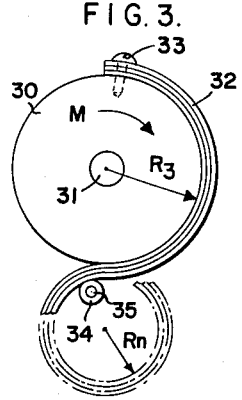
FIG. 4. FIG. 5. FIG. 6.
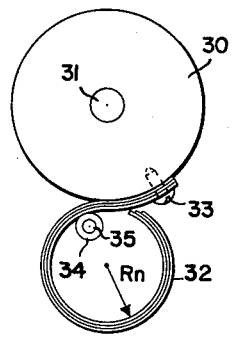
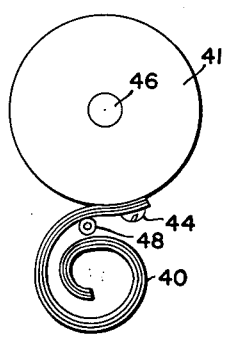
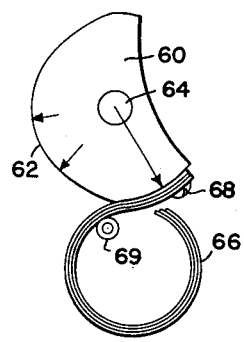
FIG. 7. FIG. 8. FIG. 9.
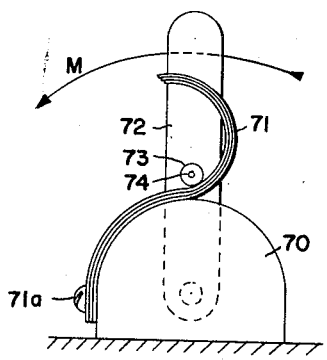
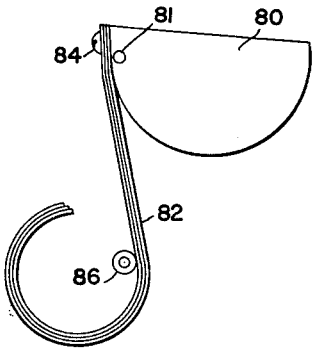
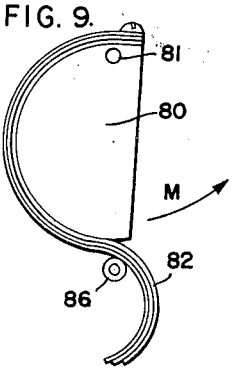
*INVENTOR.*
CHARLES PERNETTA
BY
ATTORNEYS July 31, 1962 C. PERNETTA 3,047,280
SPRING MOTOR Filed Feb. 18, 1960 4 Sheets-Sheet 2

INVENTOR.
CHARLES PERNETTA
BY
ATTORNEYS

July 31, 1962 C. PERNETTA 3,047,280
SPRING MOTOR
Filed Feb. 18, 1960 4 Sheets-Sheet 3

INVENTOR.
CHARLES PERNETTA
BY

ATTORNEYS

July 31, 1962 C. PERNETTA 3,047,280
SPRING MOTOR
Filed Feb. 18, 1960 4 Sheets-Sheet 4
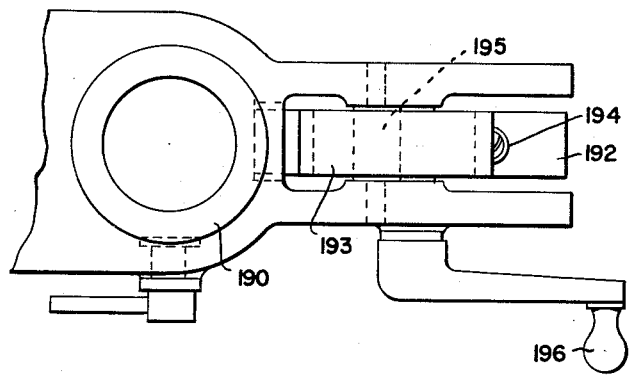
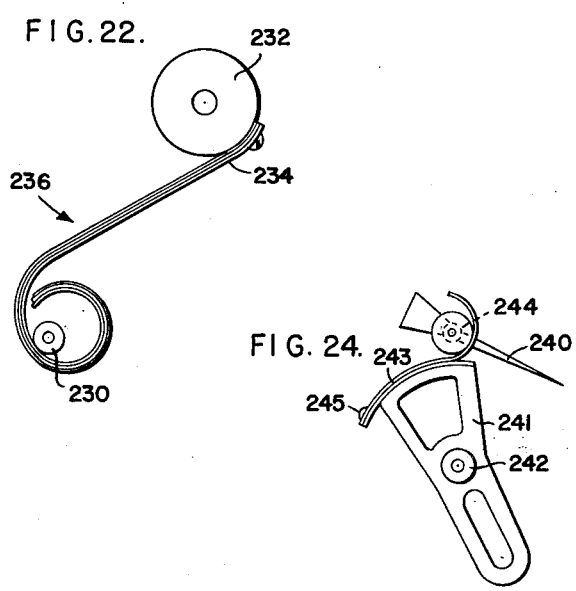
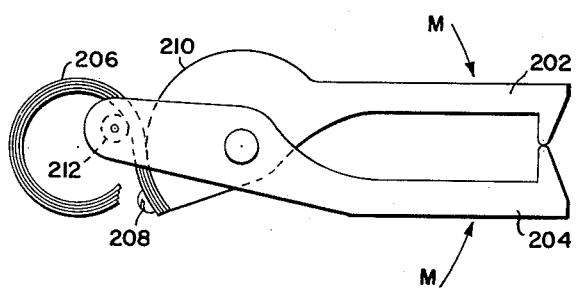
INVENTOR.
CHARLES PERNETTA
BY
ATTORNEYS

United States Patent Office 3,047,280
Patented July 31, 1962

3,047,280
SPRING MOTOR
Charles Pernetta, London, England, assignor, by mesne assignments, to Ametek, Inc., New York, N.Y.
Filed Feb. 18, 1960, Ser. No. 9,612
Claims priority, application Great Britain Feb. 25, 1959
10 Claims. (Cl. 267—1)

The invention relates to spring motors employing spring strips which have been preset to a curvature. Such springs are obtainable, for example, under the registered trademarks "Neg'ator" and "Tensator" and may provide a constant or variable non-cumulative force.

The invention provides a spring motor comprising a curved member, a second member and a plurality of spring strips each preset to a curvature and laminated together with the inside laminate bearing only locally against the second member and making less than one turn there around and with one end of each laminate secured (directly or indirectly) to the curved member, said motor being energized by relative movement between the two members such that the spring strips are drawn around the second member and parts thereof are bent over the curved member in a curvature which is in the reverse sense to that which they have been preset.

In view of the fact that, in the present invention the spring bears only locally against the second member, it follows that the second member is smaller than the coils of the spring when free.

A motor having the characteristic feature of the invention has various practical advantages including freedom of the spring to coil to its fullest natural extent with a minimum of friction.

Preferably the said second member is in the form of a roller which is free to rotate about its axis as the spring passes over it.

The arrangement may be that the spring coils around the second member, engaging the member only locally or the spring may, after its engagement with the second member, form a free coil (or coils) which does not surround the member. The latter arrangement has the particular advantage that several coils may be formed which are free from frictional engagement with one another.

In one form of the invention the two members are spaced apart so that there is a length of the spring strips extending between them and the relative movement is so limited that no more than this length is bent around the curved member during energization whereby no part of the strips suffers complete reversal of curvature during energization and de-energization of the motor.

Some specific embodiments of spring motors and some applications thereof, according to the invention will now be described by way of example and with reference to the accompanying drawings in which:

FIGURE 1 is a side elevation of one form of spring strip,

FIGURE 1a is a vertical section on the line a—a in FIGURE 1,

FIGURE 2 is a side elevation of another form of spring strip.

Figure 10:
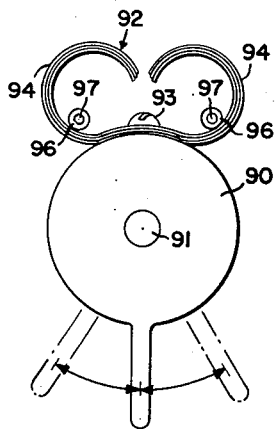
Figure 11:
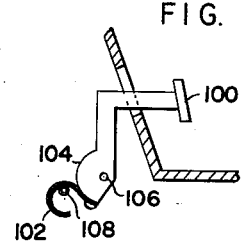
Figure 12:
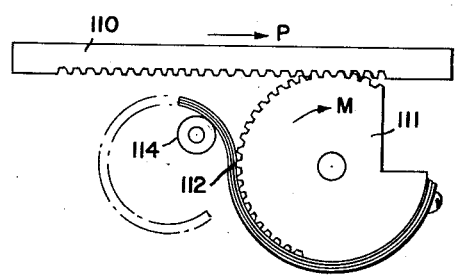
Figure 13:
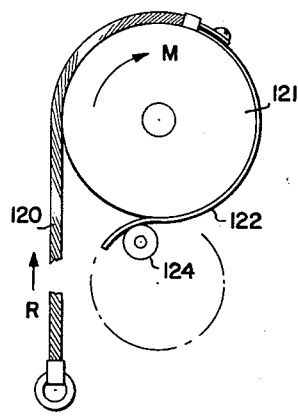
Figure 15:
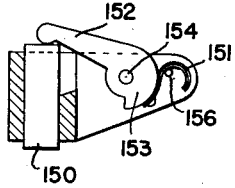
Figure 14:
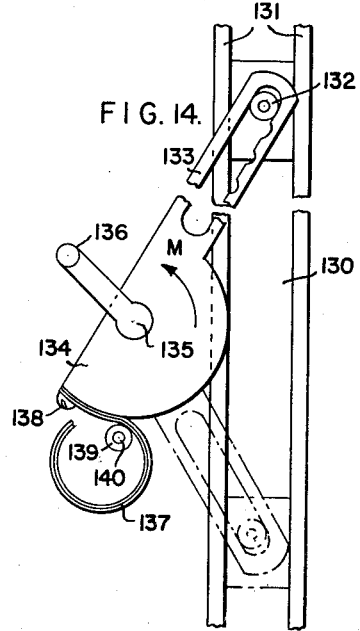
Figure 16:
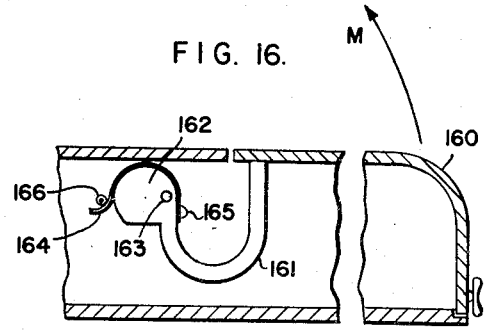
Figure 17:
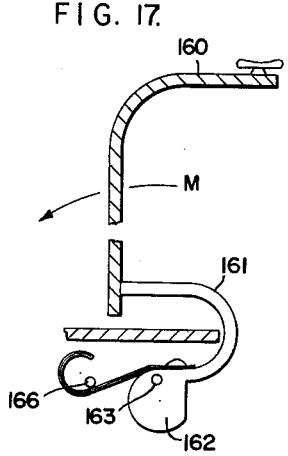
Figure 18:
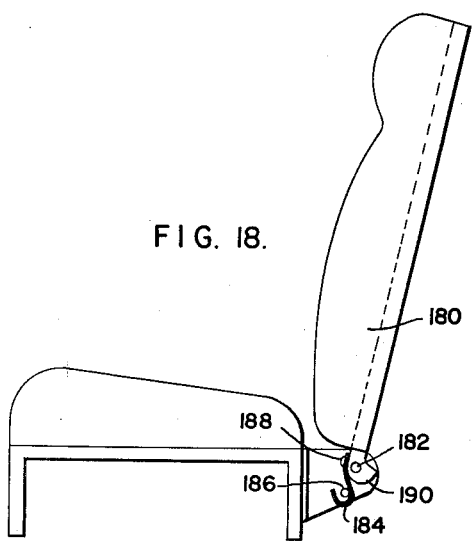
Figure 19:
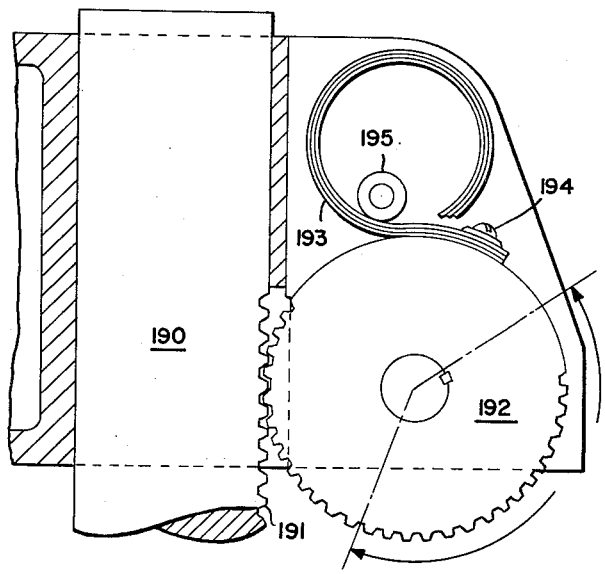

FIGURE 3 is a side elevation of one form of spring motor in accordance with this invention, FIGURE 4 is a side elevation of spring motor of FIGURE 3 in a different position, FIGURE 5 is a side elevation of an alternative embodiment of spring motor in accordance with this invention, FIGURE 6 is a side elevation of an alternative embodiment of spring motor in accordance with this invention, FIGURE 7 is a side elevation of an alternative embodiment of spring motor in accordance with this invention, FIGURE 8 is a side elevation of an alternative embodiment of spring motor in accordance with this invention, FIGURE 9 is a side elevation of spring motor of FIGURE 8 showing the motor in the energized position, FIGURE 10 is a side elevation of an alternative embodiment of spring motor in accordance with this invention, FIGURE 11 is a side elevation of an automobile accelerator pedal embodying spring motor in accordance with this invention, FIGURE 12 is a side elevation of a rack and pinion embodying the spring motor in accordance with this invention, FIGURE 13 is a side elevation of a cable and drum embodying the spring motor in accordance with this invention, FIGURE 14 is a side elevation of a sliding panel embodying the spring motor in accordance with this invention, FIGURE 15 is a side elevation of a commutator brush embodying the spring motor in accordance with this invention, FIGURE 16 is a vertical section through an automobile boot or bonnet incorporating a spring motor in accordance with this invention, FIGURE 17 is a vertical section through the boot or bonnet of FIGURE 16 showing the boot or bonnet in open position, FIGURE 18 is a side elevation of an adjustable seat-back embodying the spring motor in accordance with this invention, FIGURE 19 is a side elevation of a machine head embodying the spring motor in accordance with this invention, FIGURE 20 is a plan view of the machine head of FIGURE 19, FIGURE 21 is a side elevation of another form of spring strip, FIGURE 22 is a side elevation of another form of spring motor, FIGURE 23 is a side elevation of a pair of clamping jaws embodying a spring motor in accordance with this invention, and FIGURE 24 is a side elevation of an indicating instrument embodying a spring motor in accordance with this invention.

In each example the spring motor produces a force acting around an axis (i.e. a torque) and the angular displacement about that axis is less than one revolution. Furthermore the motor in each of the specific embodiments shown embodies a laminated spring of which each laminate has the form shown in FIGURE 1 or FIGURE 2 and in FIGURE 1a. Other forms of spring laminates such as that shown in FIGURE 21 and those later described may however be substituted as described. In each case the spring makes less than one turn around the second member although, as seen in FIGURE 5 and later described, it may form more than one free coil.

In FIGURES 1 and 1a there is shown a single strip 2 of spring material which tends to coil up to a circular form, i.e. the strip has a uniform "set radius" along its length. Such a strip forms a constant force spring strip.

FIGURE 2 shows an alternative form in which a strip 4 of spring material tends to coil up to a spiral form, i.e. the strip has a non-uniform "set radius" along its length.

FIGURE 3 shows one form of a motor according to the invention and comprising a cylindrical member 30 (constituting the aforesaid curved member) rotatably mounted on an axle 31 and having a laminated spring 32, consisting of three strips of the kind shown in FIGURE 1, attached to it by a screw 33. A small guide roller 34 rotatably mounted on an axle 35 bears against the side of the spring remote from the member 30. The roller 34 constitutes the second member as aforesaid and has a diameter substantially less than that of the spring when freely coiled. The roller engages the spring at a distance from the drum which is less than the radius of the spring when free. This location of the roller is adopted in several of the following examples.

The spring 32 is reverse-wound on the member 30 and tends to coil up as shown in FIGURE 4 (which shows the same device). In so doing, the spring will exert a torque and rotate the member 30 between the positions shown in FIGURES 3 and 4.

FIGURE 5 shows a similar form of motor but here a spring 40 consists of several superimposed strips each of the kind shown in FIGURE 2 and tends to coil up as shown into an open spiral form. Spring 40 is secured to drum 41 by a screw 44 and drum 41 is rotatably mounted on axle 46. A small roller 48 bears against spring 40. In so doing it will exert a non-uniform torque with a positive force gradient on the cylindrical member 41. It is within the invention so to rewind the spring of FIGURE 2 that the smaller end of the natural spiral is outermost and to attach this end to the member 41. In this case a non-uniform torque with a negative force gradient will be produced.

FIGURE 6 shows a modified form of the motor according to FIGURES 3 and 4 in which the cylindrical member (31, 41) is replaced by a member 60 having a curved surface 62 of non-uniform curvature and rotatably mounted on axle 64. Laminated spring 66 consists of springs of the kind shown in FIGURE 1 laminated together and secured to member 60 by a screw 68 but it will exert a varying torque on the member 60 as it coils up because of the non-uniform curvature of the surface. A roller 69 bears against spring 66.

FIGURE 7 shows a form of motor in which a fixed member 70, having a semi-cylindrical surface and a spring 71 attached to it by screw 71a, has a lever 72 pivoted on the member. The lever 72 carries a small roller 73 pivotally mounted on an axle 74. The spring 71 consists of strips each of the kind shown in FIGURE 1, and in coiling up, exerts a uniform torque on the lever 72 tending to rotate the lever about its attachment to the member 70.

FIGURES 8 and 9 show a further form of motor in which a rotatable member 80 having a semi-cylindrical surface is pivoted on the axis 81 which is eccentric with regard to the cylindrical surface. A laminated spring 82 secured to member 80 by screw 84 and consisting of strips of the kind shown in FIGURE 1, in coiling up, exerts a non-uniform torque on the member 80 because of the eccentricity of the pivot and rotates the member between the positions shown in FIGURES 9 and 8. As in previous modifications, a roller 86 bears against spring 82.

FIGURE 10 shows a form of centralizing motor in which a cylindrical member or drum 90 pivotally mounted on an axle 91 has a spring 92 attached to it by a bolt 93. The spring consists of strips having a natural "set" at each end. Each coiled part 94 of the spring consists of strips of the kind shown in FIGURE 1. Two small rollers 96 mounted on axles 97 engage the concave side of the spring remote from the drum 90. If the member 90 is turned in either sense a torque (e.g. constant) is exerted on it tending to oppose the motion. It is arranged that in the central position of the drum neither part of the spring exerts any torque on the drum, and movement in either direction loads one part of the spring while leaving the other part unloaded, the roller 97 separating from this part. This form of motor may be applied, for example, to indexing mechanisms, two-way limit switches and counters.

In the motor shown in FIGURE 22 the roller 230 is spaced so far from rotatably mounted drum 232 that in operation no part of laminated spring 234 (formed from the springs of FIGURE 1) which coils around the roller is subjected to reverse bending around the drum 232. That is to say, only portion 236 of the spring which is set to the same radius as the remainder of the spring and which is shown as being held substantially straight due to its connection to drum 232 and contact with roller 230 is wound onto drum 232 during energization of the motor. This feature has the advantage that for a given fatigue life of the spring the diameter of the drum 232 may be reduced, and the free radius of the spring may also be reduced. Alternatively the fatigue life may be increased. In use, that portion of the spring which in its operating cycle passes from its free diameter around the roller 230 to a straightened condition changes from zero stress to a maximum working stress, its working stress range being therefore equal to its maximum stress. The other portion of the strip which, in its operating cycle deflects from the straightened condition to a reverse curvature round the drum 232 is subjected to a still higher maximum working stress but as its working deflection is less than that of the first portion, the working stress range is lower. One portion of the strip therefore has a low maximum working stress with a high stress range whilst the other portion has a high maximum working stress with a low stress range. The motor may be so arranged that the fatigue lives of the two spring portions are approximately equal. If desired, a spring which is preset to two different radii may be used; the larger radius preferably being arranged to operate around the drum.

FIGURE 11 shows the application of a motor of a form similar to that shown in FIGURES 3 and 4, to an accelerator pedal 100 of an automobile. A laminated spring 102 (formed from the springs of FIGURE 1) is secured to semi-circular portion 104 of pedal 100 which is pivoted at 106. A roller 108 bears against spring 102. In this application the strength of the spring may, if desired, be made sufficient to resist the full weight of the foot, so that the foot can rest against the pedal 100 without depressing it. The spring exerts a constant torque on the pedal and so the foot must exert a constant force throughout the depression of the pedal. A second spring of conventional helical form may be provided to provide a variable reaction as the pedal is depressed. Alternatively one of the spring motors which provides a positive force gradient, as described above, may be used. The form of motor shown in FIGURE 22 may be substituted for that shown and, in some cases, may be preferred.

FIGURE 12 shows an application of a motor to a rack 110 and pinion 111. The motor is similar to that shown in FIGURES 3 and 4, except that the pinion 111 replaces the member 30. It will be noted that the spring 112, which consists of strips of the construction shown in FIGURE 1, wraps around the teeth of the pinion and exerts a uniform torque upon it. A roller 114 bears against spring 112. Here again the motor may be constructed according to FIGURE 22.

FIGURE 13 shows a motor, in the form shown in FIGURES 3 and 4, applied to a cable 120 and a drum 121. The drum 121 replaces the member 30 and laminated spring 122 consists of strips of the kind shown in FIGURE 1, so that it exerts a constant torque on the drum and therefore a constant pull on the cable. A roller 124 bears against spring 122. In a modification of the device shown, the drum is circumferentially grooved for reception of the cable beneath the spring. A motor according to FIGURE 22 may be substituted for that shown.

FIGURE 14 shows a motor of the form shown in FIGURES 3 and 4, applied to a sliding panel (e.g. a window pane). The panel moves between slides 131 and is pivotally attached at 132 to a slotted arm 133. The arm 133 is integral with a semi-cylindrical drum 134 rotatable about an axis 135 (concentric with the semi-cylinder) by a handle 136 which is shown as being integral with the drum 134 but may, if desired, have a ratio-changing gear connection thereto. The drum is attached to a spring 137 by a bolt 138, and a small roller 139, on an axle 140, abuts the side of the spring remote from the drum. The spring consists of strips of the form shown in FIGURE 1 or, preferably that shown in FIGURE 21 and later described, and exerts a torque on the drum substantially to counterbalance the weight of the panel and the arm. Clutch or brake means may be incorporated to prevent the panel being moved (e.g. in the opening direction of a window) otherwise than by the handle. The spring arrangement may be replaced by that shown in FIGURE 7. The features of FIGURE 22 may be adopted in this application.

FIGURE 15 shows a motor of the form shown in FIGURES 3 and 4, applied to a commutator brush 150 of an electrical motor. The necessary force is transferred from the spring 151 passing around roller 156 and which consists of strips of the form shown in FIGURE 1, by a lever 152 integral with a semi-cylindrical disc 153 and pivoted at 154. The motor may be modified to conform to the construction of FIGURE 22.

FIGURES 16 and 17 show a motor similar to that shown in FIGURES 8 and 9, applied to an automobile boot cover or bonnet 160 which is carried by a curved arm 161 integral with a contoured drum 162 pivotally mounted at 163. A spring 164 consisting of several strips of the kind shown in FIGURE 1 is attached to the drum by a bolt or screw 165 and a roller 166 is provided as in the previous constructions. It is arranged that the spring exerts maximum torque on the cover or bonnet in its position shown in FIGURE 16. The minimum torque exerted on the bonnet in the position shown in FIGURE 17 is arranged to be sufficient to keep the bonnet open.

In FIGURE 18 a motor similar to that just described is shown applied to balancing the weight of a seat-back 180 pivoted at 182. The seat can be maintained at several positions by mechanism not shown. The seat-back is overbalanced so that on disengaging this mechanism the seat-back returns to its upright position. The overbalancing is accomplished by motors of the type previously described. A laminated spring 184 (made from springs of the type of FIGURE 1) passes around roller 186 and is secured at 188 to rounded portion 190. In each of the two applications just described, the motor may be modified to conform to FIGURE 22.

In FIGURES 19 and 20 a motor similar to that described with reference to FIGURE 12, is shown applied to a support for a machine head (e.g. the head of a drilling machine) comprising a vertical machine column 190 provided with a rack 191 engaging a pinion 192. The spring 193 is attached by a bolt 194 to the pinion at a part devoid of teeth. A roller 195 is provided as in the previous construction. The spring consists of strips of the form shown in FIGURE 1 and exerts a uniform torque on the pinion to balance the machine head. The pinion is rotatable by a handle 196. The modified motor shown in FIGURE 22 may be adopted in this case also.

If a laminated spring of which the leaves have a natural set of the form shown in FIGURE 21 is used in place of that shown in FIGURE 1, in a motor of the form shown in FIGURES 3 and 4, a sinusoidal force characteristic may be obtained.

FIGURE 23 shows an application of a motor of the form shown in FIGURES 3 and 4 to a pair of hinged jaws 202 and 204 which may be used for clamping or as part of a measuring instrument. A laminated spring 206 secured at 208 to rounded portion 210 of jaw 202 passes around a roller 212 mounted on jaw 204. The motor may be modified to the form shown in FIGURE 22.

In FIGURE 24 there is shown a further application of such a motor, this application being to the operation of the pointer 240 of a delicate measuring instrument not subject to shock or impulse movements. In this instrument the movements of the curved member 241 about axis 242 are transmitted by laminated spring 243 secured at 245 to the rotatable roller 244 which carries the pointer. Here again the motor may be modified as shown in FIGURE 22.

The invention is not limited to the details of the foregoing embodiments and applications described by way of example. For instance, the motors may be applied also, for example, to hand-levers and controls, the return of telephone dials, typewriter keys, door-closers, tailboards, dropsides, hoppers and downwardly-hinged oven doors. In the case of the cooperating or "second" member rotating about the curved body to which the spring is attached, the path of the second member may be as desired and, if circular, may have an axis of rotation other than the radial centre of the body. The motors may be applied to other constructions, in addition to that of FIGURE 23, in which both members may be movable, e.g. to close or open the members of a toggle-joint. The "second" member may be a peg or lug instead of a roller. Different strips in a laminated spring may have different torque deflection characteristics. Springs having non-uniform characteristics may wind on bodies having non-uniform curved surfaces. The free ends of the laminations of a spring may be fixed rigidly together so that the laminations separate as the spring is wound up and inter-lamination friction is reduced.

Two or more laminated springs, each with its own second member or roller may be arranged to cooperate with a single curved member.

What is claimed is:

1. A spring motor comprising a curved member, a guide member spaced from said curved member, said members being mounted for relative movement with respect to each other, a laminated strip coil spring set to a predetermined curvature, the spring having one end thereof secured to said curved member and the spring bearing locally against the guide member and making a partial turn around and spaced from the guide member, said motor being energized by a relative angular movement of less than 360° between said members such that the spring is drawn around the guide member and parts thereof are bent over the curved member in a curvature which is in the reverse sense to that which the spring is preset.

2. A spring motor in accordance with claim 1 in which the spring comprises a plurality of spring strips, each strip being preset to a constant radius of curvature.

3. A spring motor in accordance with claim 1 in which the spring comprises a plurality of spring strips with at least two of said strips being preset to different curvatures.

4. A spring motor in accordance with claim 1 in which the laminated spring is preset to a varying radius.

5. A spring motor in accordance with claim 1 in which the curved member and the guide member are spaced apart a distance sufficient to provide a straightened section of spring at least equal to the length of spring transversed during energization.

6. A spring motor in accordance with claim 5 in which the spring comprises a plurality of spring strips, each strip being preset to a constant radius of curvature.

7. A spring motor in accordance with claim 5 in which the spring comprises a plurality of spring strips with at least two of said strips being preset to different curvatures.

8. A spring motor in accordance with claim 5 in which the spring is preset to a varying radius.

9. A spring member in accordance with claim 5 in which the portion of the spring adapted to be bent around the curved member during energization has a different preset curvature from that portion of the spring which passes around the guide member during energization.

10. A spring member in accordance with claim 5 in which the portion of the spring adapted to be bent around the curved member during energization has a larger preset radius of curvature than that portion of the spring which passes around the guide member during energization.

References Cited in the file of this patent
UNITED STATES PATENTS

| | | |
|---|---|---|
| 268,989 | Bishop | Dec. 12, 1882 |
| 1,776,261 | Kreissig | Sept. 23, 1930 |
| 1,925,621 | Allendorf | Sept. 5, 1933 |
| 2,647,743 | Cook | Aug. 4, 1953 |
| 2,899,193 | Foster | Aug. 11, 1959 |